May 27, 1924.  1,495,611
A. PARROUFFE
HYDRAULIC MOTOR
Filed July 16, 1921
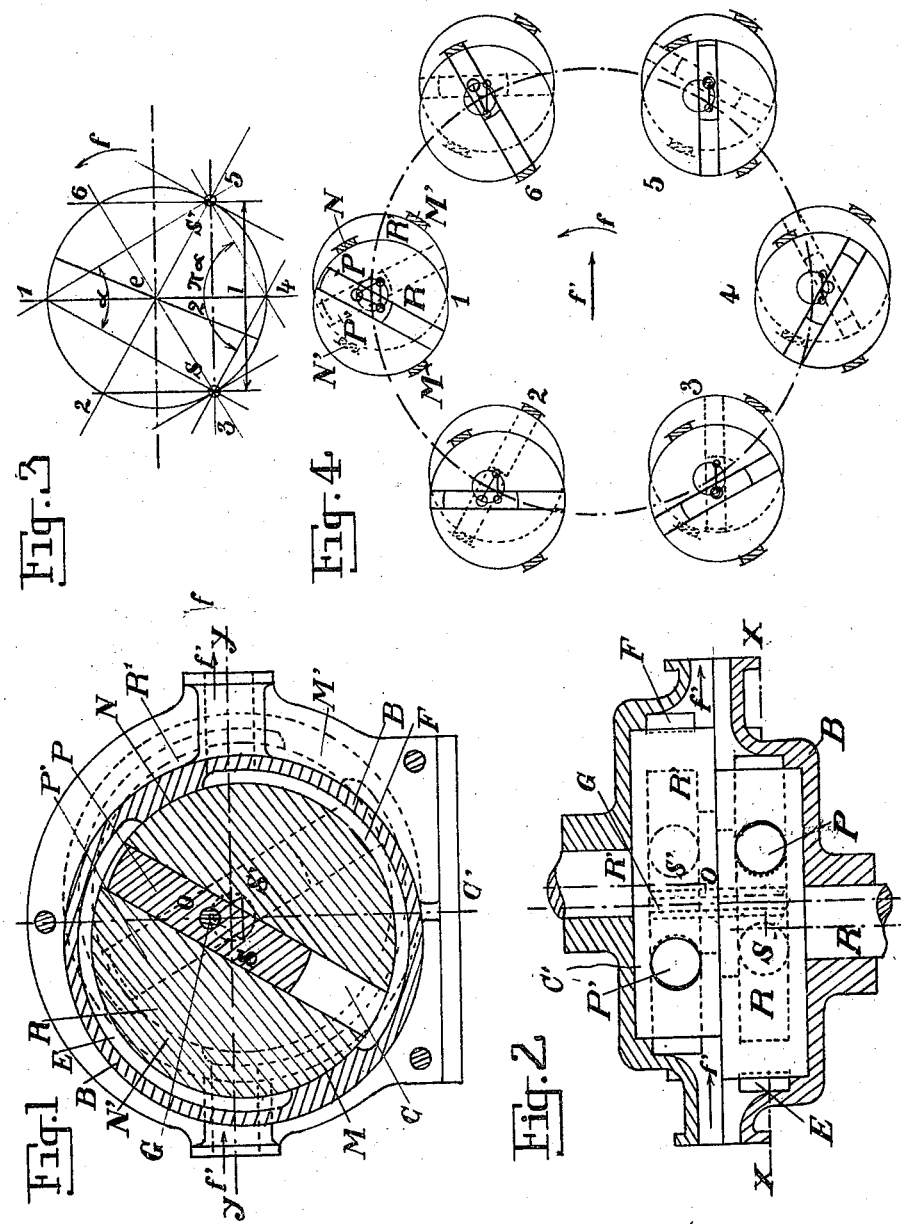
ANDRÉ PARROUFFE
*Inventor:*
per
Haseltine, Lake & Co
*Attorneys.*

Patented May 27, 1924.

1,495,611

UNITED STATES PATENT OFFICE.

ANDRÉ PARROUFFE, OF MARSEILLE, FRANCE.

HYDRAULIC MOTOR.

Application filed July 16, 1921. Serial No. 485,402.

(GRANTED UNDER THE PROVISIONS OF THE ACT OF MARCH 3, 1921, 41 STAT. L., 1313.)

*To all whom it may concern:*

Be it known that I, ANDRÉ PARROUFFE, a citizen of the Republic of France, residing at Marseille, in the Republic of France, have invented certain new and useful Improvements in and Relating to Hydraulic Motors (for which I filed an application in France, July 8, 1919, Patent No. 501,546), of which the following is a specification.

The present invention relates to improvements in hydraulic motors in which the co-operating movements of a number of pistons and cylinders is controlled by a working fluid.

According to this invention the motor comprises two rotary members adapted to rotate around parallel axes, the members having cylinders in which work pistons. The pistons are rigidly coupled together at an angle to form a planetary system.

According to this invention, the working parts of one rotating member control the working parts of the other rotating member and vice versa.

By this invention all intermediate transmission members such as cranks, rods, cams, eccentrics and the like are avoided. The working fluid acts directly on the coupled pistons and the motion between the respective parts of this type of motor is similar to that of the component parts of the known "Oldham's" coupling.

The invention is more particularly described with reference to the accompanying drawings in which:—

Figure 1 is a sectional elevation taken on the line $x$—$x$, Fig. 2;

Figure 2 is a sectional plan view taken on the line $y$—$y$, Fig. 1;

Figures 3 and 4 are diagrams, Fig. 3 indicating the nature of the movement of the planet, and Fig. 4 indicating the relative positions of the parts of the motor in six different positions.

The first element of the cooperating pair comprises an integral shaft and rotor disc R in which is formed a cylinder C extending diametrically through the disc. The cylinder C contains a piston P adapted to reciprocate therein; and a fixed casing which also serves as a fluid distributing (control) device B is provided and is concentric with the rotor.

The distributing device B has an inlet or fluid supply chamber E and an exhaust or fluid discharge chamber F. The two chambers E, F being separated by abutments M and N engaging the periphery of the disc R.

The second element of the pair comprises an integral shaft and rotor disc R', a cylinder C', piston P' and controlling abutments M' and N'.

The axes of rotation of the two discs R, R' are parallel. The centers S, S' or the axes will be termed poles, the distance between which is called the polar distance and denoted by $l$.

The pistons are rigidly coupled together by means of a connecting pin G at an angle $\alpha$ which is termed the angle of coupling. The pin G extends parallel to the axes of rotation and the two pistons which move in a planetary fashion will be termed the planet element whose center is at O.

Figure 3 is a diagram illustrating that during rotation the locus described by the center of the planet O is a circumference divided by poles S, S' into segments of angles $\alpha$ and $2\pi-\alpha$ respectively. This circumference is the planetary orbit.

The relative movements of the planet are the movements of rotation and reciprocatory movements causing the relative displacement of the pistons in the cylinders.

Figure 4 shows diagrammatically the planetary element and the closing abutments in six different positions which the said parts occupy during the complete cycle of the motor, the first and fourth positions being positions of symmetry.

In the second and fifth positions, i. e. the positions indicated by 2 and 5, Fig. 4, the cylinders are at their maximum and minimum capacities respectively. In the third and sixth positions the planet uncovers the poles which may be termed the eclipse positions for the planetary member, and the return strokes of the pistons in their cylinders commence.

In any given position, for instance the second position shown in Fig. 3 the lengths 2S and 2S' on the scale of polar distance $l$ will give the distance from the centers of each cylinder and of its piston that is to say the extension of its reciprocatory movement, from this the relative position of the elements at any place can be determined. The maximum length of path described by a cylinder is twice the orbit.

The pistons will be seen to be double acting. By analyzing the different positions in Figure 4 it will be seen that when the apparatus is rotating in the direction shown by the arrow $f$ the fluid is moving in the direction of the arrow $f'$. Such an arrangement is reversible so that it may act as motor or as a driving unit.

By forcing the fluid under pressure in the direction of the arrow $f'$ a direction of rotation of the rotor in the direction of the arrow $f$ is obtained. The inverse movement can be obtained by reversing the direction of the fluid under pressure. Steam, liquids under pressure, compressed air or gas may be used as a driving medium.

On the other hand by rotating one of the rotors or both simultaneously in the direction of the arrow $f$ the fluid will be propelled in the direction of the arrow $f'$ as in the case of receivers, pumps, compressors, fluid meters and the like. The coupling of the machines is based on the following geometric factors:—the polar distance, the angle of coupling, and the dimensions and positions of the openings and of the distributing abutments.

By moving the pole S' nearer to or further away from the pole S (Fig. 3) the stroke of the cylinders can be varied. By moving S' to the left of S the direction of rotation is changed.

By altering the angle of coupling the amount of movement can be varied. The regulation of the distribution is obtained by alteration of the dimensions and relative positions of the fixed orifices of the distribution chamber and the movable ports of the cylinders which may be effected by making the abutment movable.

In the case of machines having planetary control, from the point of view of feeding the distribution chambers the machine may either have a common source for the two distribution boxes or as above set forth, or the machines may be arranged in cascade with a control box at the admission of one fed by the exhaust of the other.

In order to generalize and to facilitate definition an element will be regarded as comprising all the cylinders or all the pistons on the same diametrical section of a rotor.

All the types of this machine will not be described as they are very numerous and all follow the general principle enunciated above.

The drawings of the arrangements described show the general arrangement and not lubrication or packing devices.

Most of these rotating machines with coupled pistons are very readily lubricated and effectively controlled.

They are capable of a high output without requiring any additional transmitting element. Further they are able, whilst remaining simple in construction, to transmit an even torque.

Having now particularly described and ascertained the nature of my said invention and in what manner the same is to be performed I declare that what I claim is:—

A rotary fluid pressure motor comprising two rotary members mounted to rotate about parallel axes and having cylindrical openings extending diametrically therethrough, a casing having passages which serve as fluid distributors, and a planetary member comprising a pair of pistons arranged and coupled at an angle to each other so as to reciprocate in the cylinders during the rotary movement of the said members.

In testimony whereof I affix my signature in presence of two witnesses.

ANDRÉ PARROUFFE.

Witnesses:
ALLAN MACFARLANE,
LEWIS B. R. SPARKS.